US009533247B2

United States Patent
Wang et al.

(10) Patent No.: US 9,533,247 B2
(45) Date of Patent: Jan. 3, 2017

(54) METHOD AND APPARATUS FOR MICRO-HYDROCYCLONE PURIFICATION FOR FLUE GAS CARBON DIOXIDE CAPTURE SYSTEM

(75) Inventors: Hualin Wang, Shanghai (CN); Songbai Mao, Nanjing (CN); Qisong Shen, Shanghai (CN); Ning Ye, Nanjing (CN); Yanhong Zhang, Shanghai (CN); Jiangang Wang, Shanghai (CN); Ling Shen, Shanghai (CN); Xin Cui, Shanghai (CN)

(73) Assignees: Shanghai Huachang Environmental Protection Co., Ltd, Shanghai (CN); Research Institute of Nanjing Chemical Industrial Group, Nanjing, Jiangsu (CN)

( * ) Notice: Subject to any disclaimer, the term of this patent is extended or adjusted under 35 U.S.C. 154(b) by 673 days.

(21) Appl. No.: 13/984,406

(22) PCT Filed: Aug. 25, 2011

(86) PCT No.: PCT/CN2011/078899
§ 371 (c)(1),
(2), (4) Date: Oct. 14, 2013

(87) PCT Pub. No.: WO2012/136039
PCT Pub. Date: Oct. 11, 2012

(65) Prior Publication Data
US 2014/0026752 A1 Jan. 30, 2014

(30) Foreign Application Priority Data

Apr. 6, 2011 (CN) .......................... 2011 1 0085039
Apr. 7, 2011 (CN) .......................... 2011 1 0086083
Apr. 8, 2011 (CN) .......................... 2011 1 0087821

(51) Int. Cl.
B01D 45/16 (2006.01)
B01D 53/14 (2006.01)
(Continued)

(52) U.S. Cl.
CPC .......... *B01D 45/16* (2013.01); *B01D 53/1418* (2013.01); *B01D 53/1475* (2013.01); *B01D 53/18* (2013.01);
(Continued)

(58) Field of Classification Search
None
See application file for complete search history.

(56) References Cited

FOREIGN PATENT DOCUMENTS

CN 101314102 A 12/2008
CN 101732968 A 6/2010
(Continued)

OTHER PUBLICATIONS

International Search Report for PCT/CN2011/078899 dated Dec. 20, 2011.
(Continued)

*Primary Examiner* — Phillip Shao
(74) *Attorney, Agent, or Firm* — Greenberg Traurig, LLP; Fang Xie (57) ABSTRACT

Provided are a method and an apparatus for micro-hydrocyclone purification for a flue gas carbon dioxide capture system. The method comprises: performing gas-liquid micro-hydrocylone separation with ultralow pressure drop on scrubbed flue gas, to remove aerosol particulates entrained in the flue gas; performing gas-liquid micro hydrocyclone separation with ultralow pressure drop on off-gas vented from the top of an absorption column, to remove entrained aerosol particulates; performing gas-liquid micro hydrocyclone separation with ultralow pressure drop on cooled regeneration gas, to remove entrained aerosol par-
(Continued)

ticulates; and performing liquid-solid and liquid-liquid two-stage micro-hydrocyclone separation on a mixed amine solution lean for carbon dioxide discharged from regeneration column, to remove entrained solid particulates and machine oil. The apparatus comprises: a water scrubbing column, rotation flow separators, liquid-solid micro-hydrocyclone separator sets, a water scrubbing tank, a absorption column, a regeneration column, liquid-solid micro-hydrocyclones and liquid-liquid micro-hydrocyclones.

11 Claims, 4 Drawing Sheets

(51) Int. Cl.
  *B01D 53/18* (2006.01)
  *B01D 53/62* (2006.01)
(52) U.S. Cl.
  CPC ....... *B01D 53/62* (2013.01); *B01D 2258/0283* (2013.01); *Y02C 10/04* (2013.01); *Y02C 10/06* (2013.01)

(56) References Cited

FOREIGN PATENT DOCUMENTS

| | | |
|---|---|---|
| CN | 101785957 A | 7/2010 |
| CN | 102114359 A | 7/2011 |
| CN | 102151477 A | 8/2011 |

OTHER PUBLICATIONS

International Preliminary Report on Patentability for PCT/CN2011/078899 dated Oct. 17, 2013.

METHOD AND APPARATUS FOR MICRO-HYDROCYCLONE PURIFICATION FOR FLUE GAS CARBON DIOXIDE CAPTURE SYSTEM

CROSS-REFERENCE TO RELATED APPLICATIONS

This application is a national phase filing under 35 U.S.C. 371 of International Application No. PCT/CN2011/078899 filed on Aug. 25, 2011, which claims the benefit of and priority to Chinese Patent Application No. 201110085039.4 filed Apr. 6, 2011, Chinese Patent Application No. 201110086083.7 filed Apr. 7, 2011, and Chinese Patent Application No. 201110087821.X filed Apr. 8, 2011, all of which applications are hereby incorporated by reference in their entirety.

TECHNICAL FIELD

The invention pertains to the field of energy and environment, and relates to a microcyclonic method for purifying flue gas, tail gas, regeneration gas and mixed amine solution in a flue gas carbon dioxide capture system, particularly to a method for removing aerosol particles from flue gas, tail gas and regeneration gas, and removing solid particles and engine oil from mixed amine solution, as well as to a device for implementing said method.

BACKGROUND ART

In recent years, such problems as deteriorating greenhouse effect are grievous challenges for environment and sustainable economic development. Hence, technologies for decreasing emission of carbon dioxide which contributes to greenhouse effect and global climate change become focus of interest of various countries. Some countries, such as the United States, have proposed a method for decreasing emission of carbon dioxide-carbon dioxide capture technology, which is currently aimed mainly at capture of carbon dioxide emitted from power plants.

The emission of carbon dioxide from power industry in the world now accounts for 40% of the total emission of carbon dioxide on the earth. The global power generation capacity is predicted to be doubled in 2030. If no effective measure is taken, the emission of carbon dioxide will be increased by ⅔ accordingly. In China, where thermal power generation plays a predominant role, capture and storage of carbon dioxide in thermal power plants are particularly important for reducing emission of greenhouse gas since the carbon dioxide emitted from thermal power plants originates mostly from combustion of coal.

At present, there are mainly three carbon capture technologies under intensive development, namely post-combustion decarbonization, pre-combustion decarbonization and oxygen-rich combustion, wherein the pre-combustion capture technology can only be used in newly built power plants, while the other two technologies can be used in both newly built ones and existing ones.

Post-combustion decarbonization separates carbon dioxide from flue gas. Methods for collecting carbon dioxide mainly include chemical solvent absorption, adsorption, membrane separation and the like. The best collection method at present is absorption using amine as the chemical solvent. Amine reacts with carbon dioxide to form a salt compound. Then, the solvent is warmed up, and the compound decomposes to separate out the solvent and highly pure carbon dioxide. Since the flue gas generated in combustion contains a variety of impurities, the existence of which may increase capture cost, the flue gas needs pretreatment (water scrubbing, cooling, dewatering, electrostatic dedusting, desulfurization, denitration, etc.) before absorption to remove active impurities (sulfur, nitrogen oxides, particles, etc.) therein. Otherwise, these impurities will preferentially react with the solvent, leading to consumption of a great deal of solvent and corrosion of equipments.

Due to aerosol particles such as water entrained in flue gas, the amine solution in an absorption tower will be diluted gradually, leading to increased consumption of amine solution, and amine solution rich in carbon dioxide is discharged, resulting in discharge of highly concentrated organic pollutants which are difficult to degrade. On the other hand, these aerosol particles tend to induce foaming of amine solution in the absorption tower, and thus render loss of amine solution. As a result, amine solution is entrained in the gas discharged from the absorption tower, which further increases the consumption of amine solution and causes atmosphere pollution. A pneumatic cyclonic separation method and a device corresponding thereto may be used to control the amount of dust and liquid drops entrained in flue gas. However, the existing pneumatic cyclonic separation technology uses a drop pressure of 500-600 Pa, or even up to over 1000 Pa, and thus can no longer be applied in a system which is located after a water scrubbing tower and before a flue gas absorption tower. Otherwise, the pressure of flue gas will be insufficient, and a pressurizing system will be needed for flue gas, which is quite uneconomical. In order to control the content of aerosol in flue gas after dust scrubbing, the present invention uses a rotary flow separation technology with a lower pressure drop, i.e. a rated pressure drop of 20 mm $H_2O$ column, namely a pressure drop of 200 Pa, which is ⅓-⅕ of the pressure drop of an existing pneumatic cyclone. This can not only effectively control and capture the flue gas moisture and dust that enter an absorption tower, but also efficiently utilize the remaining pressure of the flue gas with lower partial pressure.

If the solid content in the flue gas and recycled scrubbing water that enter a water scrubbing tower is higher than 100 mg/kg, the water scrubbing tower will be clogged, resulting in shorter continuous running cycle and frequent reverse flushing. According to existing measures, the dust in flue gas is removed using a pneumatic cyclone before the flue gas enters a water scrubbing tower, and the solid in recycled scrubbing water is deposited in a water scrubbing tank. However, the flow rate of flue gas in thermal power plants is large. For example, the flue gas from a thermal power generation facility has a flow rate of 630000 $Nm^3/h$, for which a high-precision pneumatic cyclone has to be selected to capture the aerosol particles having an average particle size of about 4 microns in the flue gas. Thus, the pneumatic cyclone has a huge profile size and a high construction cost. In addition, the overall pressure of the flue gas is only 2000 Pa. If an existing pneumatic cyclone is selected, 600-1000 Pa will be used, and subsequent procedures will suffer from tight pressure supply. A pneumatic cyclone is not used in the invention to implement gas-liquid separation of flue gas before it enters a water scrubbing tower. Instead, flue gas is allowed to enter a water scrubbing tower directly, and the effluent water from the water scrubbing tower is subjected to liquid-solid microcyclonic separation, or the recycled scrubbing water is subjected to microcyclonic separation and purification. Additionally, since a great deal of recycled water is needed to be scrubbed due to the enormous amount of flue gas to be treated, a technical solution combining partial microcyclonic separation and multi-stage microcyclonic concentration of sludge is used in the invention, which can ensure not only no lowering or minute lowering of the remaining pressure of flue gas, but also clearance and enrichment of PM2.5 particles in the flue gas.

In an existing flue gas carbon dioxide capture system, after carbon dioxide in flue gas is absorbed and captured by a carbon dioxide absorbent in an absorption tower, a tail gas of the carbon dioxide capture system is generated. The tail gas entraps a lot of aerosol particles, particularly PM2.5 particles, which, if not captured and removed before the tail gas is emitted to atmosphere, will render a severe hazard to atmospheric environment as well as entrainment loss of scrubbing liquid. This will increase the running cost of the whole set of flue gas carbon dioxide capture facility to a large extent, and influence the economic efficiency greatly. Therefore, a momentous technical problem in the field of energy and environment is how to recover these aerosol particles. An existing method for capturing aerosol particles involves a rotary flow separator or an electrical trap, among which the pressure drop of the former is generally 500-600 Pa, or even up to over 1000 Pa. This existing technology can not be used in a flue gas carbon dioxide capture system for the following reasons. First, the pressure drop is too high, and the tail flue gas from the top of an absorption tower can not sustain such high consumption of pressure drop. Second, if an existing cyclone technology is to be selected, the tail flue gas has to be pressurized, which is complex and uneconomical. With regard to an electrical trap, hidden safety trouble exists due to high moisture content in tail flue gas. In addition, the cost of an electrical trap is high, and there is no appropriate and economical electrical trap in the industry. Therefore, a micro-size rotary flow separator with low pressure drop and high separation accuracy has to be selected.

In a flue gas carbon dioxide capture system, mixed amine solution particles are entrained in regeneration gas carbon dioxide and may have negative impact on subsequent devices and processes, even leading to environmental pollution. Another issue is the loss of aerosol particles. For example, a carbon dioxide carbon facility on a scale of 1 million tons/year consumes about 1600 tons/year of mixed amine solution solvent annually at a price of 40 million yuan (RMB). 80% of the mixed solvent that has been consumed is taken away by purifying gas in the form of aerosol, particularly PM2.5 particles. How to recover these aerosol particles is a great technical challenge in the field of energy and environment. An existing method for capturing aerosol particles involves a rotary flow separator or an electrical trap, among which the pressure drop of the former is generally 500-600 Pa, or even up to over 1000 Pa. This existing technology can not be used in a flue gas carbon dioxide capture system for the following reasons. First, the pressure drop is too high, and the flue gas having low partial pressure can not sustain such high consumption of pressure drop. Second, if an existing cyclone technology is to be selected, the flue gas has to be pressurized, which is complex and uneconomical. With regard to an electrical trap, hidden safety trouble exists due to high moisture content in regeneration gas. In addition, the cost of an electrical trap is high, and there is no appropriate and economical electrical trap in the industry. Therefore, a micro-size rotary flow separator with low pressure drop and high separation accuracy has to be selected.

For capture of flue gas carbon dioxide, Research Institute of Nanjing Chemical Industry Group has developed a new technology for capturing low-partial-pressure (flue gas, etc.) $CO_2$, wherein $CO_2$ is captured using a mixed amine solution consisted of aqueous MEA solution as the bulk and active amine, antioxidant and erosion retarder as additives, and the problems of high loss of amine due to degradation, serious erosion of equipments, high consumption of energy, etc., have been solved thereby. But in long-term operation, plenty of solid particles and engine oil are entrained in the mixed amine solution. If they are not removed before the mixed amine solution enters an absorption tower, downstream lines and devices will be clogged unavoidably. Not only the efficiency of carbon dioxide capture will be deteriorated, but also the whole set of facility will likely be paralyzed. At present, an activated carbon filter is generally disposed in front of an absorption tower to remove solid particles and engine oil entrained in mixed amine solution. However, the operational principle of an activated carbon filter is adsorption of impurities into the activated carbon particles. The filter has good initial adsorption effect, but its adsorption capacity will inevitably decrease to certain degree after a long period of time, and its adsorption effect will decrease as well. As a result, the activated carbon in the activated carbon filter has to be scrubbed or replaced periodically, which influences the safe, steady and efficient operation of the whole set of flue gas carbon dioxide capture facility. Liquid-solid microcyclones and liquid-liquid microcyclones in prior art are capable of removing solid particles and engine oil entrained in mixed amine solution efficiently, with the separation accuracies for solid particles and oil drops being 3 microns and 10 microns respectively. Moreover, the filter is resistant to clogging and needs no replacement of inner members. It is thus suitable for long-term steady use.

SUMMARY

The invention provides a microcyclonic purification method and device for a flue gas carbon dioxide capture system, so that the problems in prior art have been solved.

In one aspect, the invention provides a microcyclonic purification method for a flue gas carbon dioxide capture system. The method comprises:

(a) subjecting dust-scrubbed flue gas to gas-liquid microcyclonic separation at ultralow pressure drop to remove aerosol particles, namely water particles, dust particles and liquid-solid composite particles, which are entrained in the flue gas, so as to obtain dust-scrubbed and dewatered flue gas with very low levels of water and dust;

(b) subjecting recycled scrubbing water to liquid-solid microcyclonic separation to remove solid particles entrained in the recycled scrubbing water, as well as concentrate and enrich solid particles in the recycled scrubbing water;

(c) capturing carbon dioxide component in the flue gas by absorption, wherein carbon dioxide dissolves in absorption solution and produces tail gas of the flue gas carbon dioxide capture system;

(d) subjecting the tail gas discharged from the top of a carbon dioxide absorption tower to gas-liquid microcyclonic separation at ultralow pressure drop to remove aerosol particles entrained in the tail gas, so as to obtain purified tail gas;

(e) subjecting the recovered aerosol particles to liquid-solid microcyclonic separation to remove solid particles entrained in the scrubbing solution, wherein the purified scrubbing solution is recycled to the scrubbing solution system;

(f) subjecting the regeneration gas (mainly comprising carbon dioxide) prepared in a regeneration tower to air cooling and water cooling to convert the saturated vapor that contains mixed amine solution and is entrained in the regeneration gas into foggy drops, so as to obtain regeneration gas with areosol particles entrained therein;

(g) subjecting the regeneration gas with areosol particles entrained therein to gas-liquid microcyclonic separation at ultralow pressure drop to capture aerosol particles entrained in the regeneration gas, wherein the regeneration gas from which the aerosol particles have been removed is supplied for use in subsequent working sections;

(h) coagulating the captured aerosol particles into liquid which is combined with the mixed amine solution from the bottom of the regeneration tower and directly recycled to the mixed amine solution system;

(i) cooling the carbon dioxide-lean mixed amine solution from the regeneration tower to alleviate the shear emulsion of oil/water in the mixed amine solution, so as to improve the effect of microcyclonic separation of oil and water;

(j) subjecting the cooled mixed amine solution to liquid-solid microcyclonic separation to remove solid particles entrained therein, followed by further concentration of solid particles by virtue of single or multiple-stage liquid-solid microcyclonic separation until the solid particle concentration in solid phase reaches over 10%; and (k) subjecting the mixed amine solution to liquid-liquid microcyclonic separation to remove engine oil entrained therein, followed by further concentration of engine oil by virtue of single or multiple-stage liquid-liquid microcyclonic separation until the engine oil concentration in oil phase reaches over 10%, wherein the purified mixed amine solution enters the absorption tower for capture of carbon dioxide.

In a preferred embodiment, after the treatment by the gas-liquid microcyclonic separation in steps (a), (d) and (g), the concentration of aerosol particles in the flue gas, tail gas and regeneration gas is less than 50 mg/Nm$^3$.

In another preferred embodiment, after the treatment by the gas-liquid microcyclonic separation in steps (a), (d) and (g), the average particle size of aerosol particles in the flue gas, tail gas and regeneration gas is no larger than 2.5 microns.

In another preferred embodiment, after the treatment by the gas-liquid microcyclonic separation in steps (a), (d) and (g), the rated pressure drop of the flue gas, tail gas and regeneration gas is 20 mmH$_2$O, and the maximum pressure drop does not exceed 30 mmH$_2$O.

In another preferred embodiment, after the liquid-solid microcyclonic separation in step (b), the rated pressure drop for single-stage microcyclonic separation is 0.1 MPa, and the separation accuracy reaches 90% for particles of 2 microns or larger.

In another preferred embodiment, the recycled scrubbing water subjected to liquid-solid microcyclonic separation in step (b) may be part or the whole of the recycled scrubbing water.

In another preferred embodiment, after the treatment by the gas-liquid microcyclonic separation in step (d), over 80% of the aerosol particles entrained in the tail gas may be recovered, and the aerosol particles discharged to the environment are reduced by over 80%.

In another preferred embodiment, the gas-liquid microcyclonic separation in step (d) may be carried out at the upper half part within the absorption tower or outside of the absorption tower.

In another preferred embodiment, after the liquid-solid microcyclonic separation in steps (e) and (j), over 80% of the solid particles entrained in the scrubbing solution and the mixed amine solution are removed, wherein the removal rate of the solid particles of 3 microns or larger exceeds 90%.

In yet another preferred embodiment, after the liquid-liquid microcyclonic separation in step (k), over 80% of the engine oil entrained in the mixed amine solution is removed, wherein the removal rate of the oil drops of 10 microns or larger exceeds 90%.

In still another preferred embodiment, after the liquid-solid microcyclonic separation in step (j) and the liquid-liquid microcyclonic separation in step (k), the content of the impurity components in the mixed amine solution is decreased to a great deal, whereby clogging of downstream lines and equipments is avoided, and the capture efficiency of carbon dioxide in the absorption tower is enhanced.

In the other aspect, the invention provides a microcyclonic purifying device for a flue gas carbon dioxide capture system. The device comprises:

a water scrubbing tower (1), configured to remove the dust entrained in the flue gas using the recycled scrubbing water purified through a liquid-solid microcyclone;

an ultralow-pressure-drop rotary flow separator (2) connected to the flue gas outlet of the water scrubbing tower (1), configured to remove the aerosol particles entrained in the dust-scrubbed flue gas and recover these aerosol particles;

a set of liquid-solid microcyclones (3-1, 3-2, 3-3) connected to the scrubbing water outlet of the water scrubbing tower (1) and the scrubbing water outlet of the ultralow-pressure-drop rotary flow separator (2), configured to subject the solid particles entrained in the scrubbing water to microcyclonic separation and concentrate the solid particles;

a water scrubbing tank (4) connected to the purified water outlet of the set of liquid-solid microcyclones, configured to collect and store scrubbing water for circulatory use in the water scrubbing tower;

a water scrubbing circulating water pump (5) connected to the water scrubbing tank (4) and the water scrubbing tower (1), configured to feed the scrubbing water drawn from the water scrubbing tank (4) to the water scrubbing tower (1);

an absorption tower (6), configured to absorb and capture the carbon dioxide component in the flue gas, and remove other gas components such as sulfur dioxide, nitrogen oxides and the like entrained in the tail gas;

an ultralow-pressure-drop rotary flow separator (7) connected to the tail gas outlet at the top of the absorption tower (6), configured to subject the aerosol particles entrained in the tail gas to rotary flow separation and recovery;

a set of liquid-solid microcyclones (8-1, 8-2, 8-3) connected to the scrubbing solution outlet of the ultralow-pressure-drop rotary flow separator (7) and the scrubbing solution outlet of the absorption tower (6), configured to subject the solid particles entrained in the scrubbing solution to microcyclonic separation;

a regeneration tower (9), configured to prepare regeneration gas carbon dioxide;

an air cooler (10) connected to the regeneration gas outlet of the regeneration tower (9), configured to cool the regeneration gas by air;

a water cooler (11) connected to the outlet of the air cooler (10), configured to cool the regeneration gas by water;

an ultralow-pressure-drop rotary flow separator (12) connected to the outlet of the water cooler (11), configured to subject the aerosol particles entrained in the regeneration gas to microcyclonic separation, whereby the regeneration gas is purified and the aerosol particles entrained in the regeneration gas are recovered as well;

a lean-solution pump (13) connected to the lean solution outlet at the bottom of the regeneration tower (9), configured to deliver the carbon dioxide-lean mixed amine solution;

a lean-solution cooler (14) connected to the outlet of the lean-solution pump (13), configured to cool the mixed amine solution;

a liquid-solid microcyclone (15) connected to the outlet of the lean-solution cooler (14), configured to subject the solid particles entrained in the mixed amine solution to microcyclonic separation;

a secondary liquid-solid microcyclone (16) connected to the bottom outlet of the liquid-solid microcyclone (15), configured to concentrate the solid particles;

a liquid-liquid microcyclone (17) connected to the top outlet of the liquid-solid microcyclone (15), configured to subject the engine oil entrained in the mixed amine solution to microcyclonic separation; and a secondary liquid-liquid microcyclone (18) connected to the top outlet of the liquid-liquid microcyclone (17), configured to concentrate the engine oil.

In a preferred embodiment, the sets of liquid-solid microcyclones are unexceptionally composed of two-stage or more than two-stage liquid-solid microcyclones in series.

In another preferred embodiment, all of the ultralow-pressure-drop rotary flow separators (2), (7) and (12) may be strengthened in their separation effect by using multi-stage arrangement in series, so as to remove the aerosol particles entrained in the flue gas, tail gas and regeneration gas more efficiently.

In another preferred embodiment, after the strengthened separation using the sets of liquid-solid microcyclones in series, the purified scrubbing solution is recycled to the scrubbing solution system for circulatory use, and the loss of the scrubbing solution is decreased by about 80%.

In another preferred embodiment, the aerosol particles captured by the ultralow-pressure-drop rotary flow separator (12) are recycled directly to the mixed amine solution system for circulatory use, and the consumption of the mixed amine solution is decreased by about 50%.

In another preferred embodiment, after boiling and stripping in the regeneration tower, the carbon dioxide in the rich solution is released and exported from the top of the tower, and the remaining carbon dioxide-lean mixed amine solution, in which impurity components such as solid particles, engine oil and the like are entrained, is exported from the bottom of the tower.

In another preferred embodiment, after concentrated by the secondary liquid-solid microcyclone (16) and the secondary liquid-liquid microcyclone (18), the concentrations of the solid particles and the engine oil are increased greatly, and the operation load of subsequent devices for enriching sludge and sump oil is thus reduced.

In yet another preferred embodiment, the remnant solution from the top outlet of the secondary liquid-solid microcyclone (16) and the bottom outlet of the secondary liquid-liquid microcyclone (18) is recycled to the bottom of the regeneration tower, and reenters the two-stage cyclonic purifying system of the mixed amine solution for circulating purification.

In still another preferred embodiment, each of the liquid-solid microcyclone (15), secondary liquid-solid microcyclone (16), liquid-liquid microcyclone (17) and secondary liquid-liquid microcyclone (18) may be configured as a multi-stage set of microcyclones arranged in series to improve separation efficiency.

DETAILED DESCRIPTION

After extensive and intensive study, the inventors of the present invention have discovered that:

(1) A lot of powder dust is entrained in flue gas, the raw material of a flue gas carbon dioxide capture system. If not removed, it will inevitably clog subsequent devices, and have serious impact on the continuous, steady operation of the whole set of carbon dioxide capture facility. After the powder dust entrained in the flue gas is removed by water scrubbing using a water scrubbing tower according to the present technical solution, aerosol particles, such as water particles, dust particles and liquid-solid composite particles, etc., are unavoidably entrained in the flue gas. If not removed, they'll not only render high entraining loss to scrubbing water, but also promote the rate at which the amine solution is diluted by the impurities in the flue gas, leading to foaming of the amine solution during absorption of carbon dioxide. Therefore, ultralow-pressure-drop rotary flow separators are used in the present technical solution to remove aerosol particles efficiently, so as to purify the flue gas. The arrangement of a set of liquid-solid microcyclones at the recycled scrubbing water outlet of the water scrubbing tower and at the recycled scrubbing water outlet of the ultralow-pressure-drop rotary flow separator may reduce the concentration of solid particles in the scrubbing water effectively. Thus, the concentrated scrubbing water may be allowed to enter the water scrubbing system for circulatory use. When the present technical solution is used, the purity of flue gas may be increased, and the loss of scrubbing water may be decreased by about 80%.

(2) After carbon dioxide in flue gas is absorbed by the carbon dioxide absorbent in an absorption tower in a flue gas carbon dioxide capture system, tail gas of the carbon dioxide capture system is produced. A lot of aerosol particles are entrained in the tail gas. If the aerosol particles are not removed before the tail gas is discharged to the atmosphere, they'll not only cause serious hazard to the atmospheric environment, but also bring about entraining loss to the scrubbing solution, resulting in enormously higher running cost of the whole set of flue gas carbon dioxide capture facility and great impact on the economic benefit. Thus, according to the present technical solution, an ultralow-pressure-drop rotary flow separator is disposed at the upper half part within the absorption tower or outside of the absorption tower to remove the aerosol particles efficiently, so that the tail gas is purified. The arrangement of a set of liquid-solid microcyclones at the scrubbing solution outlet of the ultralow-pressure-drop rotary flow separator and at the scrubbing solution outlet of the absorption tower may reduce the concentration of solid particles in the scrubbing solution effectively. Thus, the concentrated scrubbing solution may be allowed to enter the scrubbing solution system for circulatory use. The present technical solution may be used to reduce the discharge of aerosol particles, avoid the entraining loss of scrubbing solution, prevent the abovementioned chemicals from doing harm to the atmospheric environment, and inhibit or even eliminate pervasive smog and its erosion to equipments in cold seasons.

(3) A lot of saturated vapor containing mixed amine solution is entrained in the regeneration gas carbon dioxide (emitted from regeneration tower) from a flue gas carbon dioxide capture system. If not removed, it will degrade the quality of the regeneration carbon dioxide to a great deal, resulting in serious impact on its subsequent storage and industry application. In addition, huge entraining loss of the mixed amine solution will increase the running cost of the flue gas carbon dioxide capture facility notably, and the economic benefit will be influenced remarkably. An air cooler and a water cooler are used in tandem in the present technical solution to cool the regeneration gas carbon dioxide, and the saturated vapor that contains mixed amine solution and is entrained in the regeneration gas is liquefied into foggy drops to the maximum extent. Thus, the aerosol particles can be removed efficiently by virtue of an ultralow-pressure-drop micro-size rotary flow separator, so as to purify the regeneration gas. The captured aerosol particles are coagulated into liquid, combined with the mixed amine solution from the regeneration tower and recycled directly to the mixed amine solution system for circulatory use. When the present technical solution is used, the purity of the regeneration gas may be increased, and the consumption of the mixed amine solution may be lowered by about 50%.

(4) Certain amount of solid particles and engine oil are entrained in the carbon dioxide-lean mixed amine solution from the regeneration tower in a flue gas carbon dioxide capture system. They are readily inclined to clog downstream lines, and thus paradise the whole set of carbon dioxide capture system. Additionally, the purity of the mixed amine solution is impacted seriously by the mixing in of solid particles and engine oil, leading to significant decrease of the absorption efficiency of carbon dioxide in the absorption tower. Therefore, the solid particles and engine oil entrained therein have to be removed before the mixed amine solution enters the absorption tower. If liquid-solid microcyclones and liquid-liquid microcyclones are added, the content of solid particles and engine oil in the mixed amine solution will be decreased effectively. As a result, the purified mixed amine solution may be allowed to enter the absorption tower to capture carbon dioxide gas efficiently, and the removed solid particles and engine oil may be subjected to further concentration and purification before entering the devices for enriching sludge and sump oil, so as to alleviate the operation load of the devices for enriching sludge and sump oil.

The technical concept of the invention is as follows:

(1) subjecting dust-scrubbed flue gas to gas-liquid microcyclonic separation at ultralow pressure drop to remove aerosol particles, namely water particles, dust particles and liquid-solid composite particles, which are entrained in the flue gas, so as to obtain dust-scrubbed and dewatered flue gas with very low levels of water and dust;

(2) subjecting recycled scrubbing water to liquid-solid microcyclonic separation to remove solid particles entrained in the recycled scrubbing water, as well as concentrate and enrich the solid particles in the recycled scrubbing water;

(3) capturing carbon dioxide component in the flue gas by absorption, wherein carbon dioxide dissolves in absorption solution and produces tail gas of the flue gas carbon dioxide capture system;

(4) subjecting the tail gas discharged from the top of a carbon dioxide absorption tower to gas-liquid microcyclonic separation at ultralow pressure drop to remove aerosol particles entrained in the tail gas, so as to obtain purified tail gas;

(5) subjecting the recovered aerosol particles to liquid-solid microcyclonic separation to remove solid particles entrained in the scrubbing solution, wherein the purified scrubbing solution is recycled to the scrubbing solution system;

(6) subjecting the regeneration gas (mainly comprising carbon dioxide) prepared in a regeneration tower to air cooling and water cooling to convert the saturated vapor that contains mixed amine solution and is entrained in the regeneration gas into foggy drops, so as to obtain regeneration gas with aerosol particles entrained therein;

(7) subjecting the regeneration gas with aerosol particles entrained therein to gas-liquid microcyclonic separation at ultralow pressure drop to capture aerosol particles entrained in the regeneration gas, wherein the regeneration gas from which the aerosol particles have been removed is supplied for use in subsequent working sections;

(8) coagulating the captured aerosol particles into liquid which is combined with the mixed amine solution from the bottom of the regeneration tower and directly recycled to the mixed amine solution system;

(9) cooling the carbon dioxide-lean mixed amine solution from the regeneration tower to alleviate the shear emulsion of oil/water in the mixed amine solution, so as to improve the effect of microcyclonic separation of oil and water;

(10) subjecting the cooled mixed amine solution to liquid-solid microcyclonic separation to remove solid particles entrained therein, followed by further concentration of solid particles by virtue of single or multiple-stage liquid-solid microcyclonic separation until the solid particle concentration in solid phase reaches over 10%;

(11) subjecting the mixed amine solution to liquid-liquid microcyclonic separation to remove engine oil entrained therein, followed by further concentration of engine oil by virtue of single or multiple-stage liquid-liquid microcyclonic separation until the engine oil concentration in oil phase reaches over 10%, wherein the purified mixed amine solution enters the absorption tower for capture of carbon dioxide.

EXAMPLES

The invention will be further illustrated with reference to the following specific examples. It is to be understood that these examples are merely intended to demonstrate the invention without limiting the scope thereof. The experimental methods in the following examples for which no specific conditions are indicated will be carried out generally under conventional conditions or under those conditions suggested by the manufacturers.

Example 1

The device of the invention is utilized in the process package of the facility for recovering carbon dioxide from 1 million tons/year flue gas by Research Institute of Nanjing Chemical Industry Group, SINOPEC. The process flow chart is shown in FIGS. 1-4:

Embodiment (1)

Figure 1:
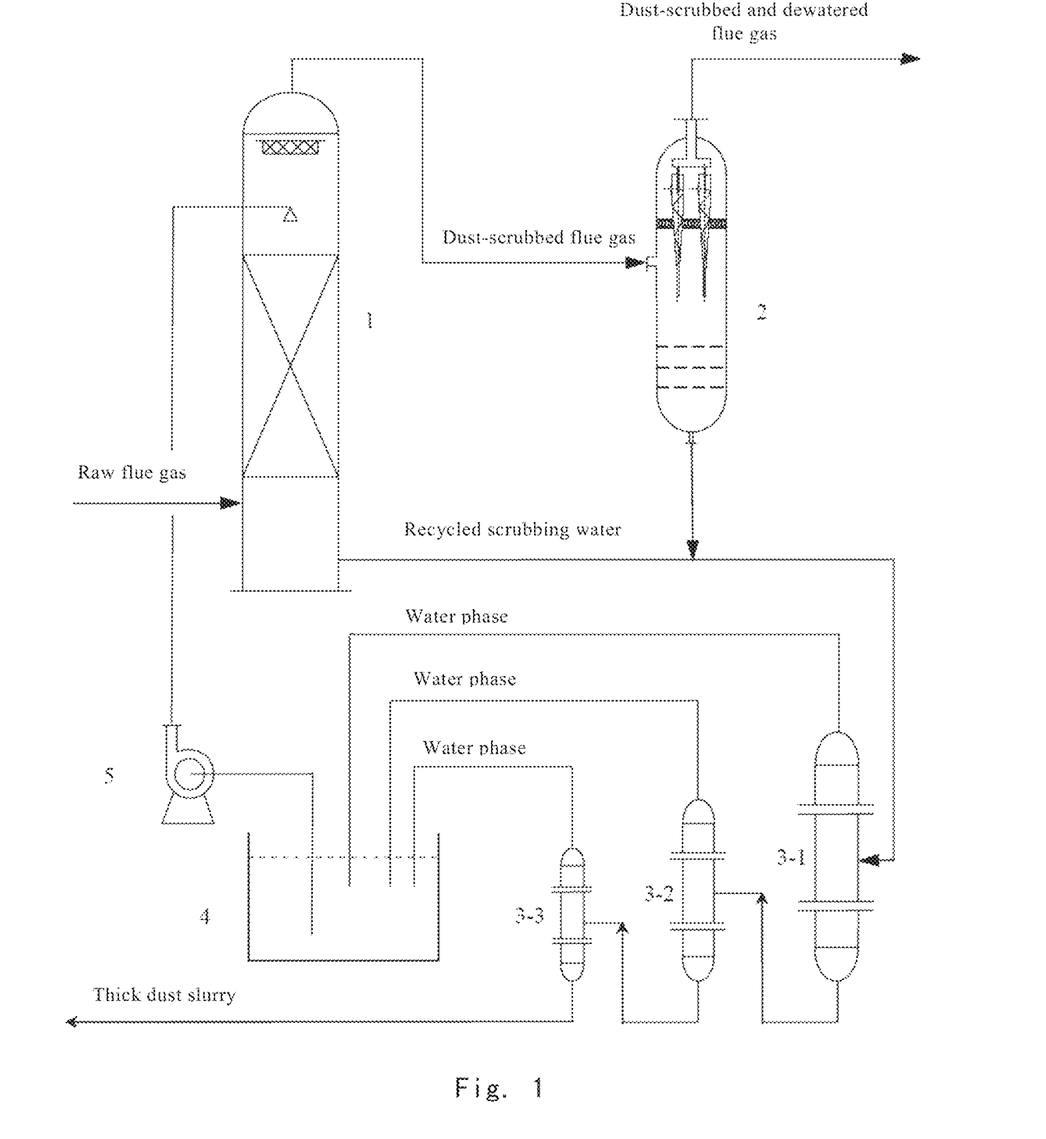
FIG. 1 is a flow chart of a cyclonic dust-scrubbing and dewatering process for flue gas in a flue gas carbon dioxide capture system according to an embodiment of the invention.

The recycled scrubbing water for flue gas is subjected to cyclonic dedusting and purification, and the sludge in the recycled scrubbing water is subjected to multi-stage cyclonic concentration, so as to remove the dust entrained in the flue gas and enrich the dust. The dust-scrubbed flue gas is subjected to ultralow-pressure-drop gas-liquid microcyclonic separation to remove the aerosol particles, namely liquid particles and liquid-solid composite particles, which are entrained in the dust-scrubbed flue gas, so as to decrease the rate at which the mixed amine solution is diluted by the impurities in the flue gas, and inhibit foaming of the mixed amine solution during absorption of carbon dioxide.

A HL/G Model Ultralow Pressure Drop Rotary Flow Separator, developed by East China University of Science and Technology independently, is selected in this technical solution to remove the aerosol particles entrained in the flue gas, and a set of HL/S Model Liquid-Solid Microcyclones are used to concentrate the recycled scrubbing water. The physical parameters of the material fed into the HL/G Model Ultralow Pressure Drop Rotary Flow Separator are listed in the following table:

| Item | Designation | Parameter | Note |
|---|---|---|---|
| 1 | Gas processing capacity | 633220 Nm$^3$/h | |
| 2 | Operating temperature | 50° C. | |
| 3 | Operating pressure | 2 kpa | |
| 4 | N$_2$ content | 82.9% | |
| 5 | CO$_2$ content | 12.5% | |
| 6 | O$_2$ content | 4.6% | |
| 7 | SO$_2$ content | <400 mg/m$^3$ | |
| 8 | NO$_X$ content | 721 mg/m$^3$ | |
| 9 | Water vapor content | Saturated | |

When the HL/G Model Ultralow Pressure Drop Rotary Flow Separator operates at the rated flow and the concentration of the aerosol particles in the inlet gas is not greater than 1500 mg/Nm$^3$, the concentration of the aerosol particles in the outlet gas is not greater than 50 mg/Nm$^3$. Additionally, the operating pressure drop of the device under standard conditions does not exceed 0.0002 MPa, which amounts to 20 mm water column. When the HL/S Model Liquid-Solid Microcyclones operate at the rated flow and the content of the solid particles at the inlet is ≤500 mg/L~5000 mg/L, the content of the solid particles at the outlet is ≤100 mg/L (based on the standard of GB260), the pressure drop between the solution inlet and the solution outlet is <0.1 MPa, and the content of the solid particles at the outlet of the third stage microcyclonic concentrator is ≤50 mg/L.

Embodiment (2)

Figure 2:
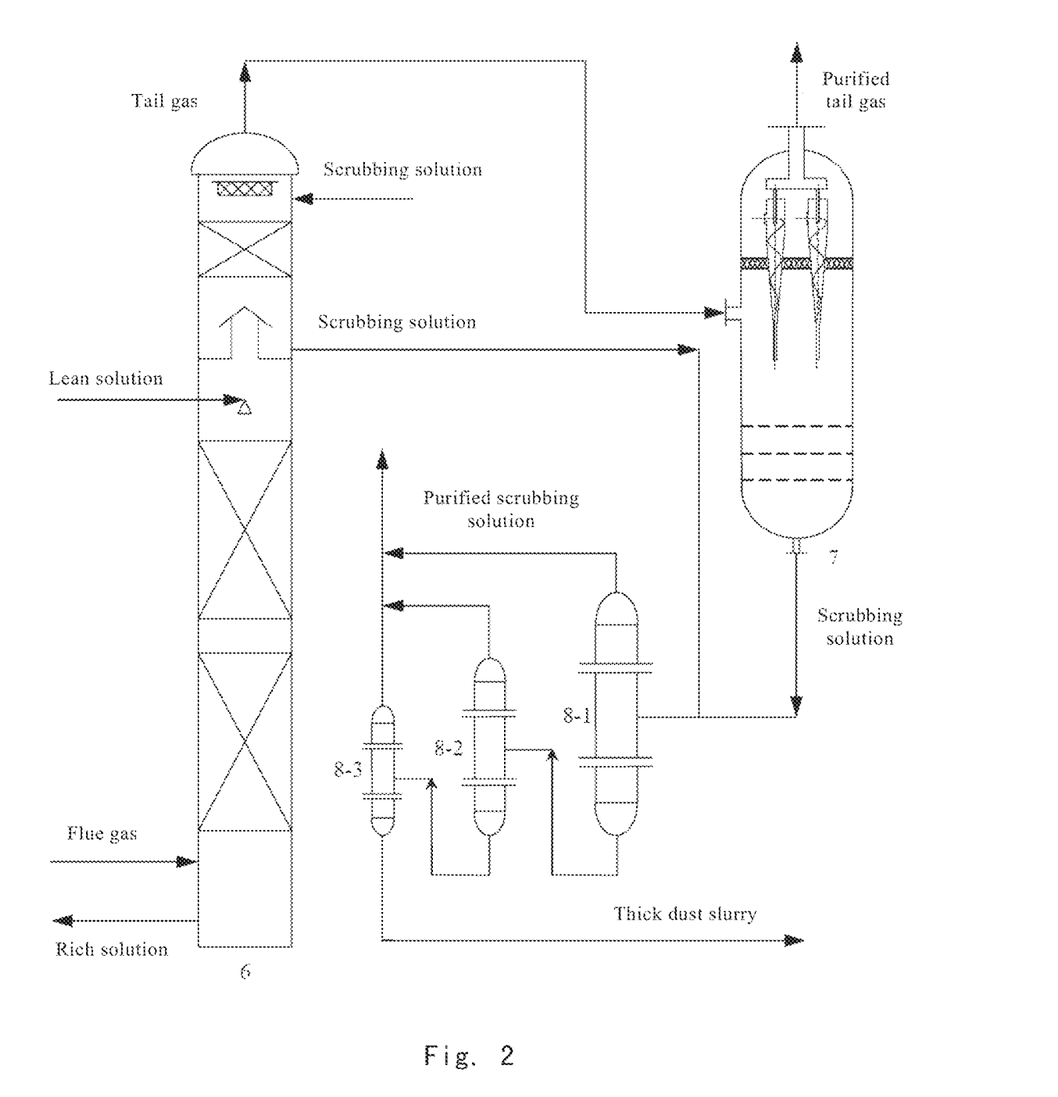
FIG. 2 is a flow chart of a cyclonic purification process for tail gas from the top of an absorption tower in a flue gas carbon dioxide capture system according to another embodiment of the invention.

The tail gas discharged from the top of the carbon dioxide absorption tower is subjected to ultralow-pressure-drop rotary flow separation to remove the aerosol particles entrained in the tail gas, wherein the recovered aerosol particles are recycled to the scrubbing solution system after liquid-solid microcyclonic separation.

A HL/G Model Ultralow Pressure Drop Rotary Flow Separator, developed by East China University of Science and Technology independently, is selected in this technical solution to remove the aerosol particles entrained in the tail gas, and a set of HL/S Model Liquid-Solid Microcyclones are used to concentrate the scrubbing solution. The physical parameters of the material fed into the Ultralow Pressure Drop Rotary Flow Separator are listed in the following table:

| Item | Designation | Parameter | Note |
|---|---|---|---|
| 1 | Gas processing capacity | 562000 Nm$^3$/h | |
| 2 | Operating temperature | 50° C. | |
| 3 | Operating pressure | 0.3 MPa | |
| 4 | N$_2$ content | 94.7% | |
| 5 | O$_2$ content | 5.3% | |
| 6 | SO$_2$ content | 80 mg/m$^3$ | |
| 7 | NO$_X$ content | 80 mg/m$^3$ | |
| 8 | Water vapor content | Saturated | |

When the Ultralow Pressure Drop Rotary Flow Separator operates at the rated flow and the concentration of the aerosol particles at the inlet is not greater than 1500 mg/Nm$^3$, the concentration of the aerosol particles at the gas phase outlet is not greater than 50 mg/Nm$^3$. Additionally, the operating pressure drop of the device under standard conditions does not exceed 0.0002 MPa, which amounts to 20 mm water column. When the HL/S Model Liquid-Solid Microcyclones operate at the rated flow and the content of the solid particles at the inlet is ≤500 mg/L~5000 mg/L, the content of the solid particles at the outlet is ≤100 mg/L (based on the standard of GB260), the pressure drop between the solution inlet and the solution outlet is <0.1 MPa, and the content of the solid particles at the outlet of the third stage microcyclonic concentrator is ≤50 mg/L.

Embodiment (3)

Figure 3:
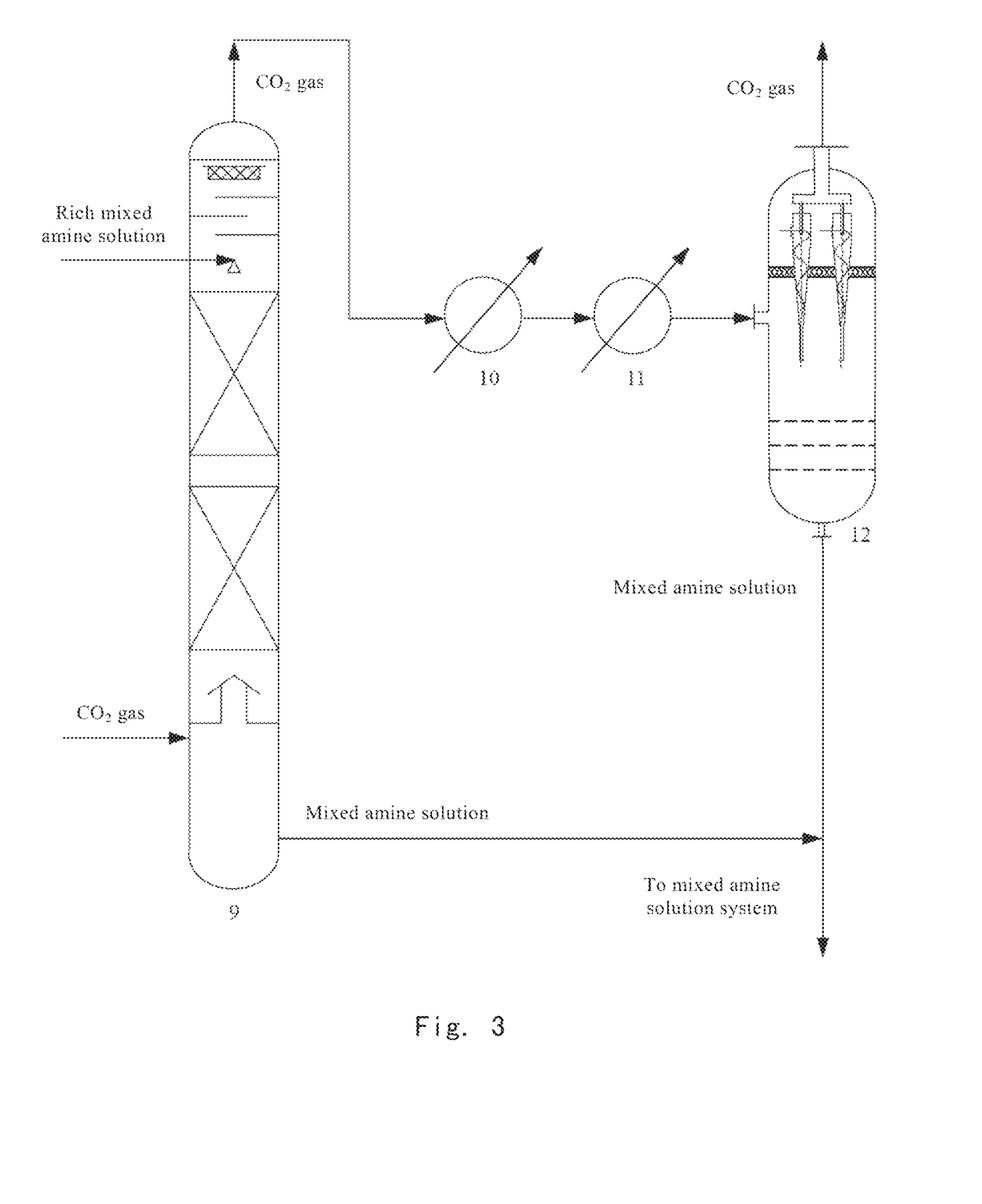
FIG. 3 is a flow chart of a microcyclonic recovery process for regeneration gas in a flue gas carbon dioxide capture system according to yet another embodiment of the invention.

First, the regeneration gas carbon dioxide from the regeneration tower is subjected to air cooling and water cooling, so as to convert the vapor entrained in the regeneration gas into foggy drops. And then, the cooled regeneration gas is subjected to ultralow-pressure-drop gas-liquid microcyclonic separation to remove the aerosol particles entrained in the regeneration gas, wherein the recovered aerosol particles are recycled directly to the mixed amine solution system.

A HL/G Model Ultralow Pressure Drop Micro-size Rotary Flow Separator, developed by East China University of Science and Technology independently, is selected in this technical solution to remove the aerosol particles entrained in the regeneration gas. The physical parameters of the material fed into the Ultralow Pressure Drop Micro-size Rotary Flow Separator are listed in the following table:

| Item | Designation | Parameter | Note |
|---|---|---|---|
| 1 | Gas processing capacity | 63640 Nm$^3$/h | |
| 2 | Operating temperature | 40° C. | |
| 3 | Operating pressure | 50 kpa | |
| 4 | N$_2$ content | 0.5% | |
| 5 | CO$_2$ content | 99.5% | |
| 6 | SO$_2$ content | <400 mg/m$^3$ | |
| 7 | Water vapor content | Saturated | |

When the Ultralow Pressure Drop Micro-size Rotary Flow Separator operates at the rated flow and the concentration of the aerosol particles at the inlet is not greater than 1500 mg/m$^3$, the concentration of the aerosol particles at the gas phase outlet is not greater than 20 mg/m$^3$. Additionally, the operating pressure drop of the device under standard conditions does not exceed 0.0002 MPa, which amounts to 20 mm water column.

Embodiment (4)

Figure 4:
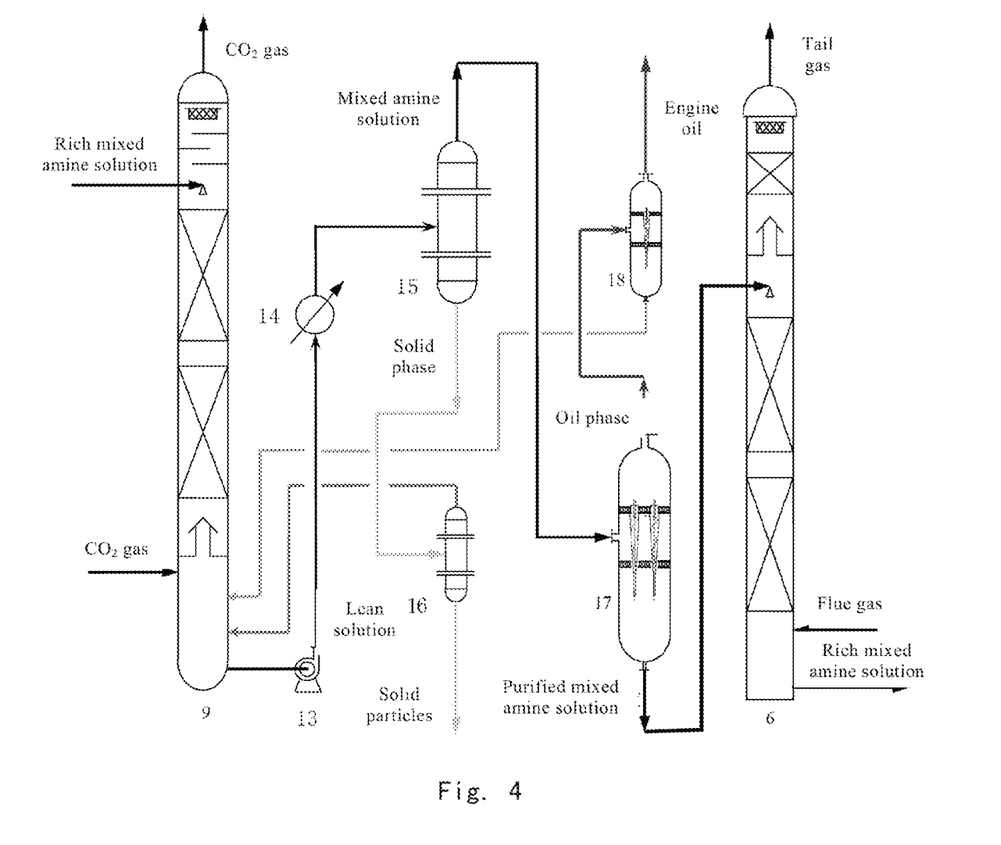
FIG. 4 is a flow chart of a two-stage cyclonic purification process for mixed amine solution in a flue gas carbon dioxide capture system according to still another embodiment of the invention.

The carbon dioxide-lean mixed amine solution from the regeneration tower is subjected to liquid-solid microcyclonic separation to remove the solid particles entrained therein and further concentrate the solid particles. The mixed amine solution after primary treatment is subjected to liquid-liquid microcyclonic separation to remove the engine oil entrained therein and further concentrate the engine oil.

A HL/S Model Liquid-Solid Microcyclone and a HL/L Liquid-Liquid Microcyclone, both developed by East China University of Science and Technology independently, are selected in this technical solution to remove the solid particles and engine oil entrained in the mixed amine solution. The physical parameters for the set of devices to process material are listed in the following table:

| Item | Designation | Parameter | Note |
|---|---|---|---|
| 1 | Processing medium | Mixed amine/engine oil/solid particles | |
| 2 | Water processing capacity | 320 m$^3$/h | |
| 3 | Density of processing medium | 1040 kg/m$^3$ | |
| 4 | Operating temperature | 60° C. | |
| 5 | Operating pressure | 0.5 MPa | |
| 6 | Oil content in mixed amine | About 700 ppm | |
| 7 | Solid content in mixed amine | About 700 ppm | |

When the HL/S Model Liquid-Solid Microcyclone operates at the rated flow and the content of the solid particles at the inlet is ≤500 mg/L~5000 mg/L, the content of the solid particles at the outlet is ≤100 mg/L (based on the standard of GB260), and the pressure drop between the solution inlet and the solution outlet is <0.1 MPa. When the oil content in the solution fed into the HL/L Model Liquid-Liquid Microcyclone is less than 1000 mg/L, the oil concentration at the liquid phase outlet is not greater than 150 mg/L (excluding dissolved oil and emulsified oil) as analyzed using Q/RCD-302-2000 weigh method, and the pressure drop between the inlet and the liquid phase outlet of the HL/L Model Liquid-Liquid Microcyclone is 0.15 MPa~0.20 MPa.

This set of microcyclonic purification devices for a flue gas carbon dioxide capture system, when used in a process flow for recovering carbon dioxide from 1 million tons/year flue gas, is convenient to operate and easy to control. It can meet the demand of coordination between industrial production and environment protection, retard the rate at which the mixed amine solution is diluted by the impurities in the flue gas, inhibit foaming of the mixed amine solution during absorption of carbon dioxide, improve the purity of the flue gas, regeneration gas and mixed amine solution, prevent the aerosol particles from doing harm to the atmospheric environment, and restrain or even eliminate pervasive smog and its erosion to equipments in cold seasons.

All of the documents mentioned in the invention are incorporated herein by reference, as if each of them was incorporated herein individually by reference. It is to be further understood that various changes or modifications can be made by those skilled in the art after reading the above teachings of the invention, and these equivalent variations fall in the scope defined by the accompanied claims of the application as well.

What is claimed:

1. A microcyclonic purification method for a flue gas carbon dioxide capture system, comprising:
   (a) subjecting dust-scrubbed flue gas to gas-liquid microcyclonic separation at ultralow pressure drop to remove aerosol particles, namely water particles, dust particles and liquid-solid composite particles, which are entrained in the flue gas, so as to obtain dust-scrubbed and dewatered flue gas with very low levels of water and dust;
   (b) subjecting recycled scrubbing water to liquid-solid microcyclonic separation to remove solid particles entrained in the recycled scrubbing water, as well as concentrate and enrich the solid particles in the recycled scrubbing water;
   (c) capturing carbon dioxide component in the flue gas by absorption, wherein carbon dioxide dissolves in absorption solution and produces tail gas of the flue gas carbon dioxide capture system;
   (d) subjecting tail gas discharged from the top of a carbon dioxide absorption tower to gas-liquid microcyclonic separation at ultralow pressure drop to remove aerosol particles entrained in the tail gas, so as to obtain purified tail gas;
   (e) subjecting the removed aerosol particles to liquid-solid microcyclonic separation to remove solid particles entrained in a scrubbing solution, wherein a purified scrubbing solution is recycled to a scrubbing solution system;
   (f) subjecting a regeneration gas, mainly comprising carbon dioxide, prepared in a regeneration tower to air cooling and water cooling to convert the saturated vapor that contains mixed amine solution and is entrained in the regeneration gas into foggy drops, so as to obtain regeneration gas with areosol particles entrained therein;
   (g) subjecting the regeneration gas with aerosol particles entrained therein to gas-liquid microcyclonic separation at ultralow pressure drop to capture aerosol particles entrained in the regeneration gas, wherein the regeneration gas from which the aerosol particles have been removed is supplied for use in subsequent working sections;
   (h) coagulating the captured aerosol particles from the regeneration gas into liquid which is combined with the mixed amine solution from the bottom of the regeneration tower and directly recycled to the mixed amine solution system;
   (i) cooling the carbon dioxide-lean mixed amine solution from the regeneration tower to alleviate the shear emulsion of oil/water in the mixed amine solution, so as to improve the effect of microcyclonic separation of oil and water;
   (j) subjecting the cooled mixed amine solution to liquid-solid microcyclonic separation to remove the solid particles entrained therein, followed by further concentration of the solid particles by virtue of single or multiple-stage liquid-solid microcyclonic separation until the solid particle concentration in solid phase reaches over 10%; and
   (k) subjecting the mixed amine solution to liquid-liquid microcyclonic separation to remove engine oil entrained therein, followed by further concentration of the engine oil by virtue of single or multiple-stage liquid-liquid microcyclonic separation until the engine oil concentration in oil phase reaches over 10%, wherein a purified mixed amine solution enters the absorption tower for capture of carbon dioxide.

2. The method of claim 1, wherein, after treatment by gas-liquid microcyclonic separation in steps (a), (d) and (g), the concentration of aerosol particles in the flue gas, tail gas and regeneration gas is less than 50 mg/Nm$^3$.

3. The method of claim 1, wherein, after treatment by gas-liquid microcyclonic separation in steps (a), (d) and (g), the average particle size of the aerosol particles in the flue gas, tail gas and regeneration gas is not greater than 2.5 microns.

4. The method of claim 1, wherein, after treatment by gas-liquid microcyclonic separation in steps (a), (d) and (g), the rated pressure drop of the flue gas, tail gas and regeneration gas is 20mmH$_2$O, and the maximum pressure drop does not exceed 30mmH$_2$O.

5. The method of claim 1, wherein, after the liquid-solid microcyclonic separation in step (b), the rated pressure drop for single-stage microcyclonic separation is 0.1 MPa, and the separation accuracy reaches 90% for particles of 2 microns or larger.

6. The method of claim 1, wherein the recycled scrubbing water subjected to liquid-solid microcyclonic separation in step (b) is part or the whole of the recycled scrubbing water.

7. The method of claim 1, wherein, after treatment by gas-liquid microcyclonic separation in step (d), over 80% of the aerosol particles entrained in the tail gas are recovered, and the aerosol particles discharged to the environment are reduced by over 80%.

8. The method of claim 1, wherein the gas-liquid microcyclonic separation in step (d) is carried out at the upper half part within the absorption tower or outside of the absorption tower.

9. The method of claim 1, wherein, after liquid-solid microcyclonic separation in steps (e) and (j), over 80% of the solid particles entrained in the scrubbing solution and the mixed amine solution are removed, wherein the removal rate of the solid particles of 3 microns or larger exceeds 90%.

10. The method of claim 1, wherein, after liquid-liquid microcyclonic separation in step (k), over 80% of the engine oil entrained in the mixed amine solution is removed, wherein the removal rate of the oil drops of 10 microns or larger exceeds 90%.

11. The method of claim 1, wherein, after the liquid-solid microcyclonic separation in step (j) and the liquid-liquid microcyclonic separation in step (k), the content of the impurity components in the mixed amine solution is decreased to a great deal, whereby clogging of downstream lines and equipments is avoided, and the capture efficiency of carbon dioxide in the absorption tower is enhanced.

* * * * *